(12) United States Patent
West

(10) Patent No.: US 8,482,893 B2
(45) Date of Patent: Jul. 9, 2013

(54) INTEGRATED PHOTOVOLTAIC SOURCE CIRCUIT COMBINER AND PROTECTION SUBSYSTEM

(75) Inventor: Rick West, Ragged Point, CA (US)

(73) Assignee: Xantrex Technology Inc., Livermore, CA (US)

( * ) Notice: Subject to any disclaimer, the term of this patent is extended or adjusted under 35 U.S.C. 154(b) by 291 days.

(21) Appl. No.: 12/892,285

(22) Filed: Sep. 28, 2010

(65) Prior Publication Data

US 2012/0074787 A1    Mar. 29, 2012

(51) Int. Cl.
*H02H 3/08*    (2006.01)
*H02H 9/02*    (2006.01)

(52) U.S. Cl.
USPC ........................................... 361/93.1

(58) Field of Classification Search
USPC ........................................... 361/93.1
See application file for complete search history.

(56) References Cited

U.S. PATENT DOCUMENTS 5,933,304 A     8/1999  Irissou ............................... 361/8
6,130,813 A *  10/2000  Kates et al. ................... 361/93.1
7,817,382 B2 * 10/2010  Yu et al. ............................ 361/13
8,094,426 B2 *  1/2012  Kellis et al. ..................... 361/109
2004/0052012 A1   3/2004  Boughton, Jr. et al. ........... 361/7

FOREIGN PATENT DOCUMENTS

WO    WO 2007/048421    5/2007

OTHER PUBLICATIONS

"TD352 Advanced IGBT/MOSFET Driver", XP55015478, http://www.datasheetcatalog.org/, Dec. 1, 2004, 13 pages.
International Written Opinion, Application No. PCT/US2011/053591, Dated Jan. 4, 2012, 8 pages.
International Search Report, Application No. PCT/US2011/053591, Dated Jan. 4, 2012, 4 pages.

* cited by examiner

Primary Examiner — Dharti Patel
(74) Attorney, Agent, or Firm — Nixon Peabody LLP

(57) ABSTRACT

A combiner circuit and voltage protection circuit is disclosed. A plurality of photovoltaic sources is provided. A set of fuses, each having one side coupled to one of the plurality of photovoltaic sources is provided. A set of contacts, each having one side coupled to the other side of one of the fuses is provided. The other side of the contacts are coupled together to combine the output of the photovoltaic sources to an output interface, the output interface being coupled to the load. A set of diodes are each coupled to each of the set of fuses and form a current path around the set of contacts. A transistor is coupled to each of the diodes and the load interface. The transistor has an on state completing the flow of current through the diodes around the set of contacts to the load interface.

20 Claims, 4 Drawing Sheets

US 8,482,893 B2

INTEGRATED PHOTOVOLTAIC SOURCE CIRCUIT COMBINER AND PROTECTION SUBSYSTEM

FIELD OF THE INVENTION

The present disclosure relates generally to photovoltaic ("PV") power plants and more particularly, to a power combiner circuit with overcurrent protection.

BACKGROUND

The drive for alternative energy has increased development of photo-voltaic ("PV") power plants that may be connected to the electrical grid. A PV power plant has a power converter which converts direct current voltage from a PV source, such as solar panels, to alternating current voltage suitable for connection to the electrical grid. As more and more large-scale PV power plants are put into operation due to increasing green energy requirements, utilities are applying more and more regulations on PV power plants, since the quality and stability of a power system may be affected by the installation of PV power plants.

Recently, as the capacity of single PV power plants has increased rapidly, the emphasis on high PV voltage installations is getting higher because such installations can lower the installation cost. An open circuit voltage of about 1000V is currently desired from many PV installers. Facing this challenge, PV plant manufacturers have combined many different PV voltage sources to achieve high voltages. Such high voltages also require relatively more expensive high voltage components in order to prevent breakdown of components from the high voltage. Of course, the PV plants also require protection of electronic components in the form of circuits that break the voltage connection when voltage over a set threshold voltage is encountered from the voltage sources.

Currently, source circuits are individually fused and then commonly coupled on the load or inverter side of the fuses. Load-break disconnect switches and DC contactors are required to break the combined circuit. However, the cost of such high power components capable of breaking high DC currents at relatively high voltages is prohibitive. Thus, it is desired for cost effective combination of PV sources with an effective break for higher voltage PV arrays.

BRIEF SUMMARY

Aspects of the present disclosure include a system for combing the voltage output of multiple photovoltaic sources to a load. The system includes a plurality of photovoltaic sources and a set of contacts. Each of the contacts has one side coupled to the one of the plurality of photovoltaic sources. The other side of the contacts are coupled together to combine the output of the photovoltaic sources to an output interface. The output interface is coupled to the load. A set of diodes are each coupled to each of the set of fuses and form a current path around the set of contacts. A transistor coupled to each of the diodes and the load interface. The transistor has an on state completing the flow of current through the diodes around the set of contacts to the load interface.

Another example is a method of protecting the components of a circuit combining the outputs of a plurality of voltage sources. A contact is attached to the output of each of the plurality of voltage sources. The contacts are opened when an abnormal current level is detected on any of the outputs. A current route is provided around the contacts by closing a transistor for a period of time necessary to open the contacts.

Another example is a machine readable medium having stored thereon instructions for allowing the interruption of power from a voltage source via a contact. A current path is formed via a diode and a transistor in an on state. The machine readable medium includes machine executable code which when executed by at least one machine, causes the machine to open the contact when an abnormal current level is detected and provide a current route around the contacts by closing the transistor for a period of time necessary to open the contact.

The foregoing and additional aspects and implementations of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

DETAILED DESCRIPTION

Figure 1:
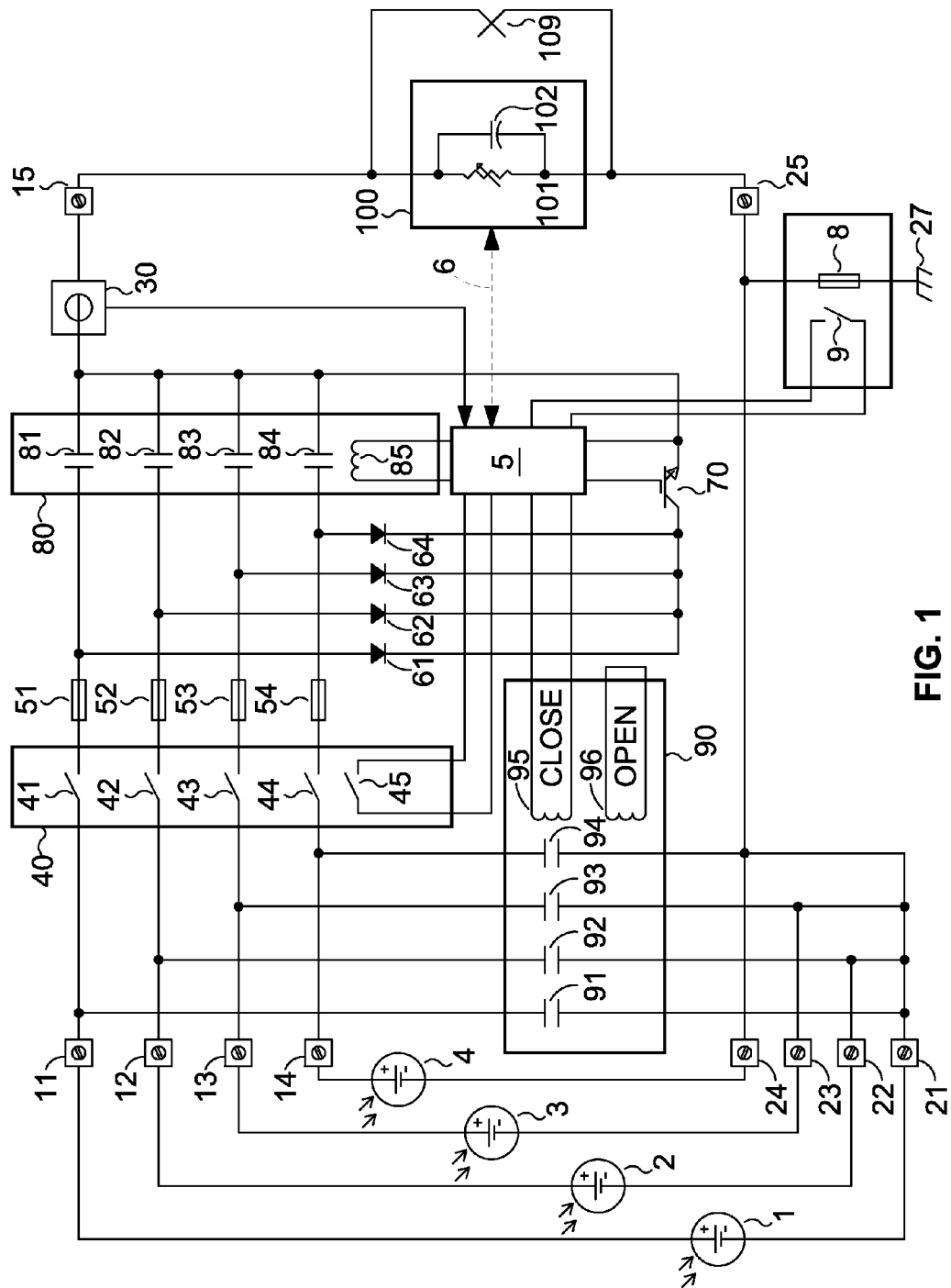
FIG. 1 is a circuit diagram of a photovoltaic master source circuit combiner and protection subsystem.

FIG. 1 is a circuit diagram of an example a photovoltaic master source circuit combiner and protection subsystem. The circuit combiner includes a power converter equivalent circuit 100, a controller 5, a bank of switches 40, a bank of contacts 80, a latching relay circuit 90 and a ground protection fuse 8. A set of fuses 51-54 are interposed between lines from the bank of switches 40 and the bank of contacts 80. A series of diodes 61-64 are coupled between respective fuses 51-54 and a transistor 70 to provide a current path around the bank of contact 80 when the transistor 70 is turned on. A relay circuit 90 having a series of relays 91-94 is coupled between respective combiner input terminal pairs 11 and 21, 12 and 22, 13 and 23 and 14 and 24 respectively. As will be explained below, the controller 5 controls the bank of switches 40, contacts 80, and relay circuit 90 and monitors switches 9 and 45 to both combine the voltage output of four photovoltaic (PV) sources 1-4 and protect the components of the circuit in FIG. 1. The PV sources 1-4 are connected across combiner input terminal pairs 11 and 21, 12 and 22, 13 and 23 and 14 and 24 respectively. It is to be understood that any multiple number of PV sources may be used with the components in the circuit in FIG. 1.

The outputs of the PV sources 1-4 are combined for a combined output across combiner output terminals 15 and 25. A current sensor 30 is coupled to the combined output of the PV sources 1-4 across the combiner output terminals 15 and 25. A resistive load 101 and a capacitive load 102 of the power converter equivalent circuit 100 are connected across combiner output terminals 15 and 25. The loads 101 and 102 and a short circuit fault 109 are the equivalent circuit for a DC-to-AC power converter 100 where the DC power is converted to AC power for connection to an electrical grid. The resistance value of the load 101 may be precisely controlled. The capacitive load 102 is the typical DC bus capacitance of a DC-to-AC power converter such as the converter 100.

The combiner circuit in FIG. 1 provides the following protective functions: (i) ampacity protection for the field wiring to PV sources 1-4 via fuses 51-54 respectively; (ii) safety/service disconnect via the switch bank 40; (iii) DC fault current load break capability via the contact bank 80, diodes 61-64 and transistor 70; and (iv) ground fault protection via the fuse 8.

The circuit placement of the fuses 51-54 in FIG. 1 between the bank of switches 40 and the bank of contacts 80 provides protection for the various components in the circuit in FIG. 1. This arrangement protects the field wiring and the current ratings of the switches 41-44 in the switch bank 40, the contacts 81-84 of the contact bank 80 and the diodes 61-64 are as well. In addition, the placement of the fuses 51-54 between the switch bank 40 and the contact bank 80 allows both ends of each fuse 51-54 to be isolated for safe replacement by opening one of the switches 41-45 on the switch bank 40 and the respective contact 81-84 of the contact bank 80 for the corresponding fuse 51-54.

Under normal conditions when the PV sources 1-4 are delivering current there are two ways to disconnect the load 101 from the PV sources 1-4. The load 101 may be disconnected by manually opening the disconnect switch bank 40 or by automatically opening the contact bank 80 under command of the controller 5. When the switch bank 40 is opened under load the following sequence occurs. An auxiliary switch 45 in the switch bank 40 signals the controller 5 that the switch bank 40 has been opened. The controller 5 signals the DC-to-AC power converter 100, via a serial communications link 6, to shut down effectively setting load 101 to an open circuit. The controller 5 then de-energizes a coil 85 in the contact bank 80 to begin opening the contacts 81-84 and drives the transistor 70 on. This causes current to flow through the diodes 61-64 and through the transistor 70 forming a current path around the contact bank 80. After a short delay for the contacts 81-84 of the contact bank 80 to fully open, the transistor 70 is gated off by the controller 5. The controller 5 then reads the current sensor 30 coupled between the contact bank 80 and the converter 100 to verify that current path between the PV sources 1-4 and the loads 101 and 102 has been broken.

In this manner, the DC-to-AC converter 100 is disconnected from the PV sources 1-4. The use of a single semiconductor device such as the transistor 70 in parallel with the contact bank 80 permits the use of only a single device for multiple contacts 81-84 with a diode 61-64 for each set of contacts 81-84. In this example, the transistor 170 is an Insulated Gate Bipolar Transistor (IGBT) that is capable of handling high current and voltages from the combined PV sources 1-4 under a short circuit condition for a short period of time.

This same sequence may be followed under "bolted" fault conditions where the load 101 has become shorted as represented by the fault 109, due to a failure in the DC-to-AC converter 100.

When a component internal to the protective circuit combiner in FIG. 1 has suffered a catastrophic failure the following sequence is followed. The auxiliary switch 45 signals the controller 5 that the switch bank 40 has been opened or a command on the serial communications link 6 requests the system to "break." Alternatively, a condition determined by the controller 5 such as sensing a current after a shutdown command may initiate a break sequence. The controller 5 then sends a signal to the DC-to-AC power converter 100 via the serial communications link 6 to shut down. The controller 5 then de-energizes the coil 85 and turns the transistor 70 on. After a short delay for the contacts 81-84 of the contact bank 80 to fully open, the transistor 70 is turned off. The controller 5 then reads the current sensor 30 to verify that the current path between the PV sources 1-4 and load 101 has been broken. If the current sensed by the current sensor 30 reads greater than zero indicating an abnormal condition, such as arcing, a fault condition is communicated via the serial link 6 and the transistor 70 is pulsed on one more time. If the current sensed by the current sensor 30 is still greater than zero, a fault is enunciated via serial link 6 and the relays 91-94 of the latching relay 90 are closed via energizing a coil 95. The further operation of the switch circuit is disabled. The latching relay 90 cannot be reset since the open coil 96 is shorted and therefore under such a condition, the combiner subsystem of the contact bank 80 and switches 40 must be replaced since a catastrophic failure has occurred.

The latching relay 90 is an optional component that may or may not be included in a given equipment design. The latching relay 90 provides a failsafe shutdown mechanism for all single component failures. An earth ground 27 is a single point ground for the system in FIG. 1. The earth ground 27 is connected to the minus output terminal 25 through a ground fault fuse 8. A switch 9 indicates the disposition of the fuse 8 to the controller 5. Typically, reclosure of the contact bank 80 is prohibited when the ground fault fuse 8 is open.

Figure 2:
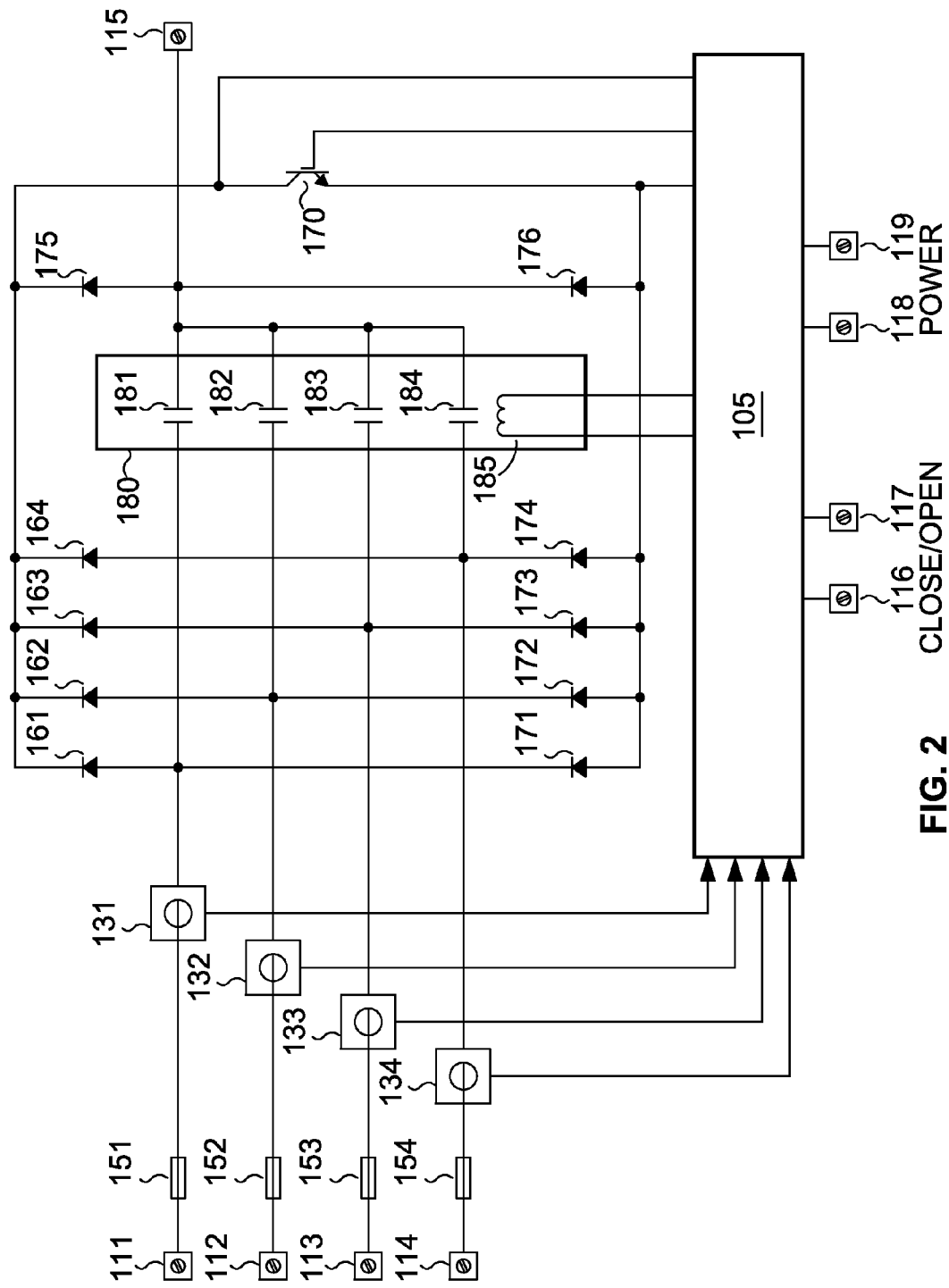
FIG. 2 is a circuit diagram of another example of a photovoltaic master source circuit combiner and protection subsystem.

FIG. 2 shows an alternate example of a multi-circuit, stand alone, AC and/or DC, bi-directional (combiner in one direction, load center in the other) circuit breaker and load break contactor. The circuit in FIG. 2 includes a set of input contacts 111-114 that are coupled to voltage sources (not shown). The input contacts 111-114 are coupled to one side of respective fuses 151-154. The other sides of the fuses 151-154 are each respectively coupled to current sensors 131-134. The fuses 151-154 are coupled to a contact bank 180 that includes contacts 181-184 which may be controlled by a coil 185. The outputs of the contacts 181-184 are combined to a single combined output contact 115 which may be coupled to a load (not shown). A series of diodes 161-164 are coupled between the fuses 151-154 and the contacts 181-84 respectively, to a transistor 170 which in turn is coupled to a diode 176. The diodes 161-164 in combination with the transistor 170, when closed, form a current path around the contact bank 180 through the diode 176 to the output contact 115. Another series of diodes 171-174 are coupled between the fuses 151-154 and the contacts 181-184 to the transistor 170. Thus, another current path is formed through a diode 175 for currents from the output contact 115 through the diodes 171-174 around the bank of contacts 180 when the transistor 170 is closed.

A controller 105 reads signals from the current sensors 131-134 and controls the contacts 181-184 of the contact bank 180 via the coil 185. The controller 105 also controls the transistor 170. The controller 105 also has close and open control inputs 116 and 117 and power control inputs 118 and 119.

The primary difference from the semiconductor assisted portion of the circuit shown in FIG. 1 and the circuit shown in FIG. 2 is the addition of diodes 171-174 to the series of diodes 161-164. The diodes 171-174 and 161-164 and diodes 175 and 176 are connected to form a full bridge rectifier around each set of contacts 181-184. Thus the series of diodes 171-174 are coupled between the inputs to the contacts 181, 182, 183 and 184 respectively and the output contact 115 via the diode 176 to form one half of the bridge. The diodes 161-164 are coupled to the other diode 175 to the output contact 115 to form the other half of the bridge. As such, current flow in either direction to and from the output contact 115 can be broken under load. In practice, the fuses 151-154 are fast clearing types and all the diodes 161-164 and 171-174 (semiconductors) in the bridge are rated to withstand the $I^2T$ (energy rating of the diode junction) required to clear all the fuses 151-154.

As with the circuit shown in FIG. 1, the contacts 181-184 allow the combination of the output of voltage sources coupled to the input contacts 111-114. The controller 105 senses the current via the current sensors 130-134 for each of the input contacts 111-114. If an abnormal current is detected, the coil 185 is denergized by the controller 105 in order to open the contacts 181-184. During the time the contacts take to open, the transistor 170 is closed to provide a current path via the diodes 161-164 around the contact bank 180.

The circuit shown in FIG. 2 incorporates the controller 105 to protect the semiconductor devices (transistors, contacts and diodes) in a number of other ways. Before the contacts 181-184 of the contact bank 180 are closed to put the voltage sources on line with the load coupled to the output contact 115, the transistor 170 is pulsed on for an initial period of time such as 5 microseconds to "sample" the load coupled to the output contact 115 for a short circuit condition that may clear the fuses 151-154. In this example, the transistor 170 is an Insulated Gate Bipolar Transistor (IGBT) provided with an adaptive drive signal. The load sampling procedure begins with a lower voltage drive signal for short durations. During each pulse, the voltage between the collector and emitter (Vce) of the transistor 170 is measured by the controller 105 for desaturation. Successive pulses are applied to the gate of the transistor 170 with increasing voltages and durations by the controller 105 until the load impedance is "measured" by when the Vce is desaturated.

During a break sequence, if the current read from the current sensors 131-134 is higher than the fuse current or if a desaturated condition is detected on the transistor 170, the break sequence will be aborted and the contacts 181-184 of the contact bank 180 will remain closed. This sequence is performed to let the fuses 151-154 clear under overload conditions beyond the current capabilities of the transistor 170.

The controller 105 may also have the capability of determining the AC and DC content of a current and decide not to engage the transistor 170 on current waveforms with little or no DC content. The controller 105 may also data log the number and intensity of load break events and calculate a cumulative end of life for the device. When the calculated end of life is reached, the controller 105 will prohibit further close operations.

The circuit illustrated in FIG. 2 may also be used as a circuit breaker by programming a preset trip level or levels into controller 105. The outputs of the current sensors 131-134 may then be compared to these levels. The device therefore functions as a ganged 4-circuit breaker with one over-current condition to trip all four circuits from each of the contact sources 111-114. The circuit in FIG. 2 may be a separate device installed on a power system. Thus the external control terminals 116 and 117 and control power supply terminals 118 and 119 are shown as required for stand alone operation. In this example, both terminals sets 116 and 117 and 118 and 119 are galvanically isolated from all device power path components.

Figure 3:
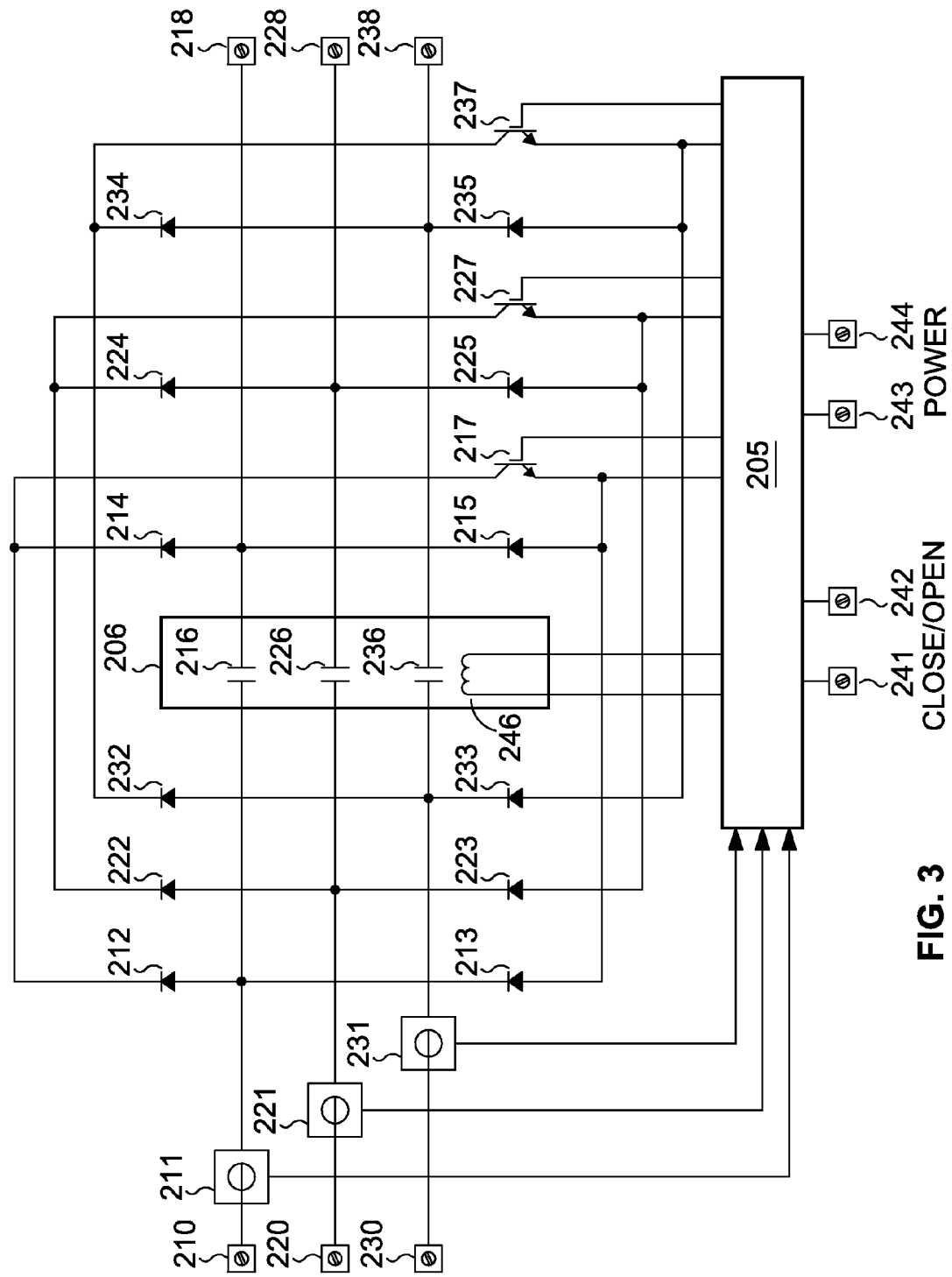
FIG. 3 is an alternative to the circuit in FIG. 2 for a three phase AC current power system.

FIG. 3 is another alternate circuit that functions as a three-phase AC circuit breaker. A series of three contacts 210, 220 and 230 are coupled to a three phase source (not shown). The current on each of the input contacts 210, 220 and 230 are sensed by respective current sensors 211, 221 and 231. The input contacts 210, 220 and 230 are coupled to the respective contacts 216, 226 and 236 of a contact bank 206. A series of diodes 212, 222 and 232 are coupled between the contacts 216, 226 and 236 and the sources of a series of transistors 217, 227 and 237. In this example, the transistors 217, 227 and 237 are Insulated Gate Bipolar Transistors (IGBT) provided with an adaptive drive signal. Another series of diodes 213, 223 and 233 are coupled between the input contacts 216, 226 and 236 and the emitters of the series of transistors 217, 227 and 237 respectively. A diode pair 214 and 215 is coupled in parallel to the transistor 217 and to the opposite end of the contact 216. Another diode pair 224 and 225 is coupled in parallel to the transistor 227 and to the opposite end of the contact 226. Another diode pair 234 and 235 is coupled in parallel to the transistor 237 and to the opposite end of the contact 236. The output from the contacts 216, 226 and 236 is coupled to the respective output contacts 218, 228 and 238 which are in turn coupled to a three phase load (not shown).

A controller 205 is coupled to the current sensors 211, 221 and 231 and reads the current levels of the input contacts 210, 220 and 230 from the sensors 211, 221 and 231. The controller 205 controls the contact bank 206 via energizing a coil 246. The controller 205 also controls each of the three phase outputs by controlling the gates of the respective transistors 217, 227 and 237. The circuit in FIG. 3 is a standalone device that may be incorporated in a power system. Thus, the controller 205 includes external control terminals 241 and 242 and control power supply terminals 243 and 244 for stand alone operation. Both terminals sets 241 and 242 and 243 and 244 are galvanically isolated from all device power path components.

The controller 205 detects current surges in any of the phased circuits via the current sensors 211, 221 and 231. If an abnormal current is detected requiring a break, the controller energizes the coil 246 to open one or more of the contacts 216, 226 or 236. The current continues to flow by turning on the respective transistor 217, 227 or 237 to form a current path around the contact bank 206 through the diodes 212, 222, or 232, transistors 217, 227 or 237 and diodes 215, 225 and 235 while the contacts 216, 226 or 236 become fully open. Current from the output contacts 218, 228 and 238 is diverted around the contact bank 206 via the diodes 214, 224, or 234 through the respective transistors 217, 227 or 237 and the diodes 213, 223 and 233.

In the 3-phase AC case in FIG. 3, the load sampling discussed above in FIG. 2, is performed by the controller 205 for each phase in line pairs via the transistors 217, 227, and 237. Thus the transistors 217 and 227 are pulsed, the transistors 227 and 237 are pulsed and the transistors 237 and 217 are pulsed for each of the line pairs before the contacts 216, 226 and 236 of the contact bank 206 are closed. For example, for the line pair between input contacts 210 and 220 and output contacts 218 and 228, each transistor 217 and 227 is pulsed on for 5 microseconds to "sample" the load for a short circuit condition. The load sampling procedure begins with a lower voltage drive signal for short durations. During each pulse, the Vce of the transistors 217 and 227 are measured by the controller 205 for desaturation. Successive pulses are applied to the gates of the transistors 217 and 227 with increasing voltages and durations until the load impedance is "measured" for the line pair. This procedure is repeated for the other two load pairs.

During a break sequence, if the current read from the current sensors 211, 221 and 231 is higher than the fuse current or if a desaturated condition is detected on the transistors 217, 227 or 237, the break sequence will be aborted and the contacts 216, 226 and 236 of the contact bank 206 will remain closed.

The advantages for the combiner circuits and the protection in FIGS. 1-3 are reduced equipment costs, improved performance and enhanced safety. Low cost AC rated disconnect switches and contactors may be used in the switching banks and contact banks in FIGS. 1-2 resulting in costs savings. The fuses 51-54 in FIG. 1 are able to be isolated for replacement when the disconnect switches 41-44 are open and the respective contacts 81-84 in FIG. 1 are opened. There is no arcing and associated electro-magnetic interference when the respective circuits break under load.

The controller 5 in FIG. 1, controller 105 in FIG. 2 and controller 205 in FIG. may be conveniently implemented using one or more general purpose computer systems, microprocessors, digital signal processors, micro-controllers, application specific integrated circuits (ASIC), programmable logic devices (PLD), field programmable logic devices (FPLD), field programmable gate arrays (FPGA) and the like, programmed according to the teachings as described and illustrated herein, as will be appreciated by those skilled in the computer, software and networking arts.

In addition, two or more computing systems or devices may be substituted for any one of the controllers described herein. Accordingly, principles and advantages of distributed processing, such as redundancy, replication, and the like, also can be implemented, as desired, to increase the robustness and performance of controllers described herein. The controllers may also be implemented on a computer system or systems that extend across any network environment using any suitable interface mechanisms and communications technologies including, for example telecommunications in any suitable form (e.g., voice, modem, and the like), Public Switched Telephone Network (PSTNs), Packet Data Networks (PDNs), the Internet, intranets, a combination thereof, and the like.

Figure 4:
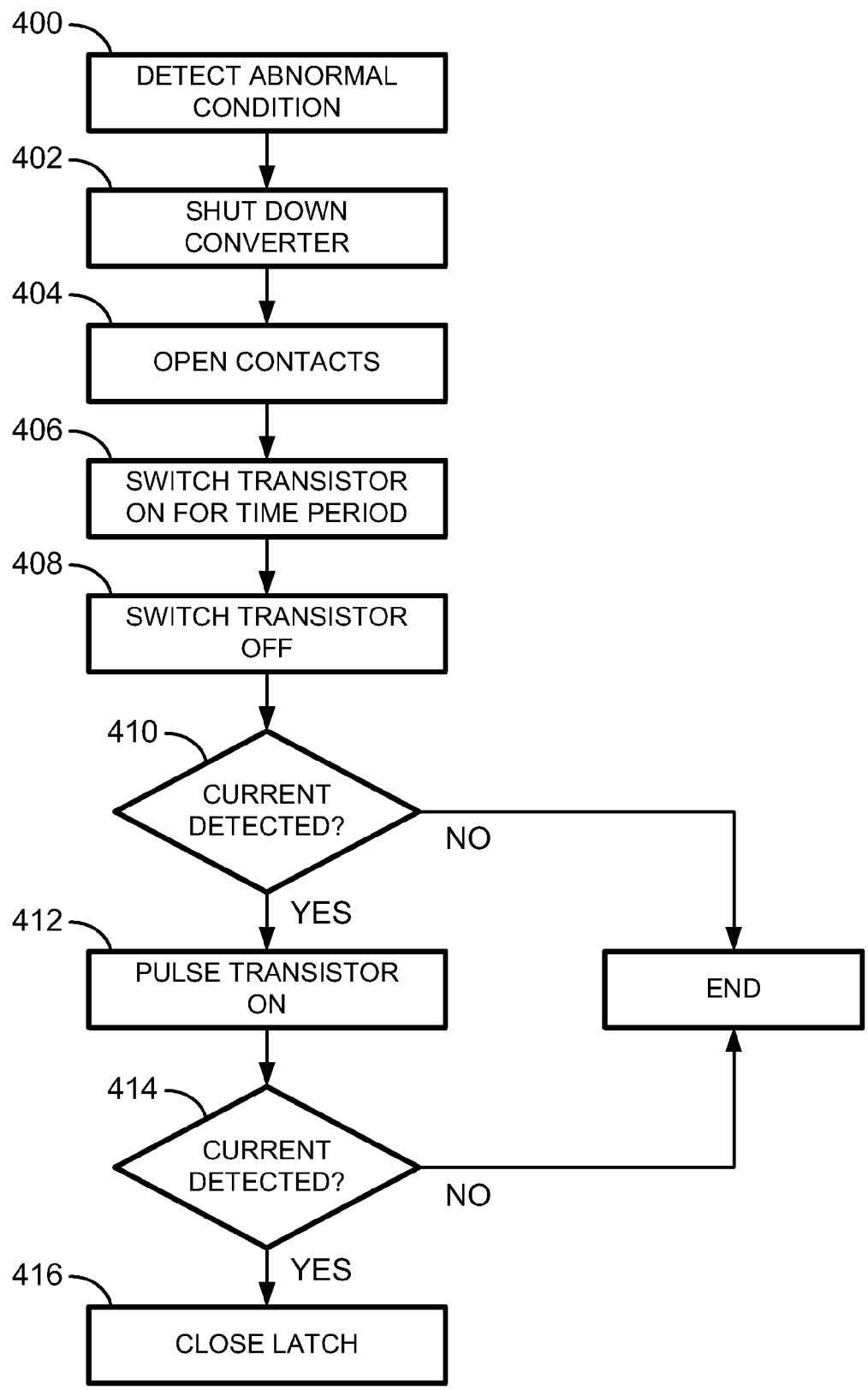
FIG. 4 is a flow diagram of a control algorithm for protection of components against abnormal conditions for the subsystem shown in FIG. 1.

The operation of the example protection sequence, will now be described with reference to FIG. 1 in conjunction with the flow diagram shown in FIG. 4. The flow diagram in FIG. 4 is representative of example machine readable instructions for protecting circuit components. In this example, the machine readable instructions comprise an algorithm for execution by: (a) a processor, (b) a controller, and/or (c) one or more other suitable processing device(s). The algorithm may be embodied in software stored on tangible media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or dedicated hardware in a well known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the protection sequence could be implemented by software, hardware, and/or firmware. Also, some or all of the machine readable instructions represented by the flowchart of FIG. 4 may be implemented manually. Further, although the example algorithm is described with reference to the flowchart illustrated in FIG. 4, persons of ordinary skill in the art will readily appreciate that many other methods of implementing the example machine readable instructions may alternatively be used. For example, the order of execution of the blocks may be changed, and/or some of the blocks described may be changed, eliminated, or combined.

A break condition such as opening a switch, or a command received on the serial communication link 6, or detection of an abnormal current from the current sensor 30 is detected by the controller 5 (400). The controller 5 signals the converter 100 to shut down (402). The controller 5 de-energizes the coil 85 to initiate opening the contacts 81-84 (404). The controller 5 then closes the transistor 70 for a delay period to allow the contacts 81-84 to fully open (406). The current is therefore allowed to flow through the diodes 61-64 through the transistor 70 and around the contact bank 80. The transistor 70 is then switched off by the controller 5 (408). The controller 5 reads the current sensor 30 to determine if the current path has been broken (410). If the current sensor 30 reads no current, the current path is broken and the process ends.

If current is still detected (410) indicating a fault, the controller 5 communicates a fault on the serial link 6 and pulses the transistor 70 on (412). The controller 5 then reads the current sensor 30 and determines if there is still current flow (414). If there is no current read from the current sensor 30, the process ends. If current is read from the current sensor (414), the controller closes the latching relay 90 (416) and thus disables operation of the circuit in FIG. 1.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

What is claimed is:

1. A system for combing the voltage output of multiple photovoltaic sources to a load, the system comprising:
    a plurality of photovoltaic sources;
    a set of contacts, each of the contacts having one side coupled to the one of the plurality of photovoltaic sources, wherein the other side of the contacts are coupled together to combine the output of the photovoltaic sources to an output interface, the output interface being coupled to the load;
    a set of diodes, each of the diodes coupled to each of the set of fuses and forming a current path around the set of contacts; and
    a transistor coupled to each of the diodes and the load interface, the transistor having an on state completing the flow of current through the diodes around the set of contacts to the load interface.

2. The system of claim 1 wherein the transistor is an insulated gate bi-polar transistor (IGBT).

3. The system of claim 1, further comprising:
    a current sensor coupled to the output interface; and
    a controller coupled to the current sensor, the transistor and the set of contacts, the controller controlling the opening and closing of the set of contacts.

4. The system of claim 3, wherein the controller detects an abnormal condition and opens the contacts while turning the transistor into an on state while the contacts are opening.

5. The system of claim 3, wherein the controller pulses the transistor and determines whether the transistor is in desaturation mode to measure the load.

6. The system of claim 1, further comprising a set of switches, each coupled to the other side of one of the set of fuses, the switches being switchable to isolate a particular fuse.

7. The system of claim 1, further comprising a second set of diodes coupled between the contacts and the transistor to allow current flow from the load interface around the set of contacts when the transistor is in the on state.

8. The system of claim 1, further comprising a set of fuses, each having one side coupled to one of the plurality of photovoltaic sources and another side coupled to one of the set of contacts.

9. A method of protecting the components of a circuit combining the outputs of a plurality of voltage sources, the method comprising:
- attaching a contact to the output of each of the plurality of voltage sources;
- opening the contacts when an abnormal current level is detected on any of the outputs;
- providing a current route around the contacts via a first set of diodes by closing a transistor for a period of time necessary to open the contacts; and
- providing a second set of diodes couples between the contacts and the transistor to allow current flow from the load interface around the set of contacts when the transistor is in the on state.

10. The method of claim 9, wherein the transistor is an insulated gate bi-polar transistor (IGBT).

11. The method of claim 9, further comprising combining the contacts to form a combined output interface.

12. The method of claim 11, further comprising, sensing the current at the combined output interface and opening the contacts when an abnormal condition is detected from the sensed current.

13. The method of claim 11, further comprising pulsing the transistor and determining whether the transistor is in desaturation mode to measure a load coupled to the combined output interface.

14. The method of claim 9, wherein a set of fuses and a corresponding set of switches is coupled between the voltage sources and the corresponding contacts, each switch and corresponding contact being switchable to isolate a particular fuse.

15. A machine readable medium having stored thereon instructions for allowing the interruption of power from a voltage source via a contact, a current path being formed via a diode and a transistor in an on state, comprising machine executable code which when executed by at least one machine, causes the machine to:
- open the contact when an abnormal current level is detected; and
- provide a current route around the contacts via a first set of diodes by closing the transistor for a period of time necessary to open the contact; and
- allow current flow from the load interface around the set of contacts via a second set of diodes coupled between the contacts and the transistor when the transistor is in the on state.

16. The machine readable medium of claim 15, wherein the transistor is an insulated gate bi-polar transistor (IGBT).

17. The machine readable medium of claim 15, wherein the contacts are combined to form a combined output interface.

18. The machine readable medium of claim 17, further comprising, sensing the current at the combined output interface and opening the contacts when an abnormal condition is detected from the sensed current.

19. The machine readable medium of claim 17, wherein the machine executable code further causes the machine to pulse the transistor and determine whether the transistor is in desaturation mode to measure a load coupled to the combined output interface.

20. The machine readable medium of claim 15, wherein a set of fuses and a corresponding set of switches is coupled between the voltage sources and the corresponding contacts, each switch and corresponding contact being switchable to isolate a particular fuse.

* * * * *